(12) United States Patent
Watanabe et al.

(10) Patent No.: US 8,532,646 B2
(45) Date of Patent: Sep. 10, 2013

(54) MOBILE COMMUNICATION SYSTEM USING ADAPTIVE MULTI-ANTENNA

(75) Inventors: Masahiro Watanabe, Kawasaki (JP);
Makoto Yoshida, Kawasaki (JP);
Hiroshi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 12/715,689

(22) Filed: Mar. 2, 2010

(65) Prior Publication Data
US 2010/0222051 A1 Sep. 2, 2010

Related U.S. Application Data

(63) Continuation of application No. PCT/JP2007/000969, filed on Sep. 6, 2007.

(51) Int. Cl.
*H04W 4/00* (2009.01)

(52) U.S. Cl.
USPC ........... 455/422.1; 455/19; 455/25; 455/63.4; 455/82; 455/553.1; 455/562.1

(58) Field of Classification Search
USPC .................... 455/422.1, 428, 441, 11.1–13.4, 455/24, 562.1, 126
See application file for complete search history.

(56) References Cited

U.S. PATENT DOCUMENTS

| | | | |
|---|---|---|---|
| 6,594,473 | B1 | 7/2003 | Dabak et al. |
| 7,039,412 | B2 | 5/2006 | Sandhu et al. |
| 7,200,368 | B1 * | 4/2007 | Hottinen et al. ............. 455/101 |
| 7,366,247 | B2 | 4/2008 | Kim et al. |
| 2002/0137538 | A1 * | 9/2002 | Chen et al. ................... 455/550 |
| 2003/0081574 | A1 | 5/2003 | Moon et al. |
| 2003/0148770 | A1 * | 8/2003 | Das et al. ..................... 455/455 |

(Continued)

FOREIGN PATENT DOCUMENTS

| | | |
|---|---|---|
| CN | 1860714 | 11/2006 |
| CN | 1901391 | 1/2007 |

(Continued)

OTHER PUBLICATIONS

International Search Report in corresponding Application No. PCT/JP2007/000969 dated Dec. 18, 2007.

(Continued)

*Primary Examiner* — Jinsong Hu
*Assistant Examiner* — Michael Nguyen
(74) *Attorney, Agent, or Firm* — Smith, Gambrell & Russell, LLP

(57) ABSTRACT

A mobile communication system using an adaptive multiantenna realizes improvement of reception characteristics, effective use of the band, and optimization of the throughput in comparison with a system in which application of the same multiantenna communication method is continued irrespective of a variation of the number of radio relay stations. The mobile communication system comprises a radio base station, a radio relay station, and mobile terminal stations for communicating with the radio base station through a radio relay station. The radio base station has a multiantenna and is characterized in that the radio base station judges if there is any variation of the number of radio relay stations when the radio base station carries out transmission through a radio relay station, and the radio base station communicates with the mobile terminal station by switching the multiantenna communication method using the multiantenna depending on the delay time of the feedback signal from the mobile terminal station if there is a variation of the number of radio relay stations.

10 Claims, 10 Drawing Sheets

(56) References Cited

U.S. PATENT DOCUMENTS

| | | | |
|---|---|---|---|
| 2005/0070285 A1 | 3/2005 | Goransson | |
| 2005/0249151 A1 | 11/2005 | Takano | |
| 2006/0009168 A1* | 1/2006 | Khan et al. | 455/101 |
| 2006/0183438 A1 | 8/2006 | Ishii et al. | |
| 2007/0037524 A1 | 2/2007 | Ishii et al. | |
| 2007/0093274 A1* | 4/2007 | Jafarkhani et al. | 455/562.1 |
| 2007/0211815 A1* | 9/2007 | Pan et al. | 375/267 |
| 2008/0080634 A1* | 4/2008 | Kotecha et al. | 375/267 |
| 2008/0227461 A1* | 9/2008 | Dayal et al. | 455/452.2 |

FOREIGN PATENT DOCUMENTS

| | | |
|---|---|---|
| JP | 200144900 | 2/2001 |
| JP | 2002016532 | 1/2002 |
| JP | 2003134035 | 5/2003 |
| JP | 200440801 | 2/2004 |
| JP | 2005323216 | 11/2005 |
| JP | 2006203274 | 8/2006 |
| JP | 200749367 | 2/2007 |
| JP | 2007104505 | 4/2007 |

OTHER PUBLICATIONS

Chinese Office Action dated Aug. 10, 2012 received in application No. 200780100508.

* cited by examiner

MOBILE COMMUNICATION SYSTEM USING ADAPTIVE MULTI-ANTENNA

CROSS REFERENCE TO RELATED APPLICATIONS

This application is a continuation of International Application No. PCT/JP2007/969, filed on Sep. 6, 2007, now pending, herein incorporated by reference.

TECHNICAL FIELD

This invention relates to a mobile communication system using an adaptive multi-antenna.

BACKGROUND ART

In recent mobile communications, there has been an increase in the distribution of "rich" content such as Internet access, streaming broadcasts, music and video, and other content in place of the voice-centered communication of conventional portable telephones. This has been accompanied by demands for faster access and improved throughput performance.

In order to address such demands, much energy is being devoted to the introduction and study of multi-antenna systems using a plurality of transmission/reception antennas in various mobile communication systems. Multi-antenna systems employ various methods, such as diversity methods, beamforming methods, and MIMO (Multi-Input, Multi-Output) methods; and methods for use are selected taking the environment, the application, and other factors into consideration.

Further, when employing a multi-antenna system in communication from a wireless base station to a mobile terminal station in mobile communications, it has for example been proposed that the velocity of motion of the mobile terminal station be estimated and the multi-antenna communication method selected, and that by this means the optimum diversity gain is obtained (see Patent Reference 1).

One multi-antenna communication method which is a method of controlling a multi-antenna system is the closed-loop method, in which information on the state of reception of forward-link transmission signals transmitted from a wireless base station are fed back from a mobile terminal station to the wireless base station, and by performing transmission at the wireless base station which reflects this reception state information, high performance is obtained.

On the other hand, an open-loop method not requiring feedback information is another method of control of multi-antenna systems. Transmission diversity employing Space-Time Coding and other techniques are employed in open-loop methods.

Other categories of methods include tracking control methods, in which each antenna is controlled so as to track relatively rapid changes in the propagation channel, and direction control methods, in which high correlation between individual antennas is assumed, and control is executed such that the propagation path direction of mobile terminal stations is tracked by the directionality formed by a plurality of antennas.

In general, closed-loop methods enable satisfactory characteristics when optimal feedback information can be utilized, and are desirable for requiring a small amount of processing on the side of the mobile terminal station. However, such methods have the drawback that there is prominent degradation of characteristics when the timing of use of the feedback information is affected by changes in the propagation channel state relative to the timing of measurement of the state of the forward-link transmission signal by the mobile terminal station.

To facilitate understanding, figures are used to explain the above in further detail.

FIG. 1 is a conceptual diagram of a mobile communication system to which the invention may be applied. The wireless base station 10 performs communication with the mobile terminal stations 11a and 11b (hereafter, when there is no need for discrimination, simply called mobile terminal stations 11), either directly without passing through a wireless relay station, or via a wireless relay station 12.

Transmissions from the wireless base station 10 to a mobile terminal station 11 through a downlink channel are called forward-link communications FC, and transmissions from a mobile terminal station 11 to the wireless base station 10 through an uplink channel are called reverse-link communications RC.

When performing communication using multi-antennas, the optimal multi-antenna communication method will differ depending on the method of antenna installation, the signal propagation environment, and other factors. And when using closed-loop multi-antenna control, the optimal method will differ depending on the delay time until the feedback information is applied.

In general, compared with the wireless base station 10, a mobile terminal station 11 has low antenna gain due to limitations on the terminal size, and transmission power is also limited. For these reasons, there are cases in which the coverage of reverse-link communications RC is smaller than the coverage 13 of forward-link communications FC.

Patent Reference 1: Japanese Laid-open Patent Publication No. 2004-40801

DISCLOSURE OF THE INVENTION

Problems to be Solved by the Invention

In order to compensate the difference in coverage of forward-link communication FC and reverse-link communication RC, it is conceivable that, as illustrated in FIG. 1, among forward-link communication FC and reverse-link communication RC, communication is performed via the wireless relay station 12 only during reverse-link communication RC, as in the case of the mobile terminal station 11b in FIG. 1.

As another configuration, when the wireless relay station 12 itself comprises a multi-antenna, as illustrated in FIG. 2, due to such reasons as reduction of the scale and cost of the equipment of the wireless relay station 12, it is conceivable that relay processing of traffic data may be performed at the wireless relay station 12, but that control thereof is handled by the wireless base station 10.

In such cases, feedback information relating to multi-antenna communication by the wireless relay station 12 is first transferred to the wireless base station 10, and analysis, antenna weight generation, and other processing is performed, after which the wireless relay station 12 performs multi-antenna control based on instructions from the wireless base station 10.

Due to the existence of the wireless relay station 12 as described above, the delay time required for transmission of feedback information can fluctuate considerably. Hence when employing a closed-loop method to a multi-antenna system, the delay time until the feedback information is applied may fluctuate considerably. Further, during communication between wireless base stations 10 and a mobile terminal station, the greater the number of intervening relay stations (the number of hops), the greater the increase in the time required for relaying, so that the delay time increases.

Below, factors affecting fluctuation of delay times are explained.

When there exist no wireless relay stations 12 which are subordinate to (existing in the wireless area of) a wireless base station 10, there is no particular need to secure a band for wireless communication with a wireless relay station 12.

However, when wireless communication comes to be performed by a wireless base station 10 with a new wireless relay station 12, or conversely, when there is no longer a need for wireless communication between a wireless base station 10 and a wireless relay station 12 with which wireless communication had been performed, the need arises to change the band to be secured in order for the wireless base station 10 to perform wireless communication with wireless relay stations 12 (setting a finite band instead of 0, increasing or decreasing a finite band, or changing a finite band to 0).

Examples in which wireless communication is newly performed with a wireless relay station 12 include a case in which a wireless relay station 12 is started from a standby state, and a case of moving so as to advance and become subordinate to a wireless base station 10.

Another example of changing the band to be secured with a wireless relay station is a case in which, due to fluctuations in the positional distribution or communication quantities of mobile terminal stations, the communication band to be allocated to wireless relay stations fluctuates.

In all of these cases, as illustrated in FIG. 3, the wireless frame configuration is modified dynamically, and so the above-described delay time fluctuates.

That is, the example illustrated in (A) of FIG. 3 is a wireless frame format for a case in which communication is performed without passing through a wireless relay station 12; a forward-link band for mobile terminal stations subordinate to the wireless base station is provided for the forward link FL, and a reverse-link band for mobile terminals subordinate to the wireless base station is provided for the mobile terminal station reverse link RL.

In the forward-link band, a forward-link measurement timing A is provided, in the reverse-link band, a feedback information transmission timing B is provided, and in the forward-link band of the next frame, a feedback information application transmission timing C, to perform transmission applying the feedback information, is provided.

At this time, the delay time from the forward-link measurement timing A to the feedback information communication timing C is short, and a multi-antenna communication method is obtained in which feedback information communication correctly corresponds to the forward link measurement result, so that there are no concerns that degradation of characteristics may occur.

On the other hand, when a wireless relay station 12 is newly added, and communication is performed between the wireless base station 10 and a mobile terminal station 11, the delay time from the forward-link measurement timing A to the feedback information application communication timing C is increased, as illustrated in (B) of FIG. 3.

This is because, as illustrated in (B) of FIG. 3, in order to secure communication time between the wireless base station 10 and the wireless relay station 12, the frame format is modified such that, in addition to the forward-link band for terminals subordinate to the wireless base station in the forward-link FL period, a forward-link band for wireless relay terminals subordinate to the wireless base station is provided, and so there is temporal separation between the measurement timing and the feedback transmission timing. Similarly, in addition to the reverse-link band for terminals subordinate to the wireless base station in the reverse-link RL period, there is the need for a reverse-link band for wireless relay stations subordinate to the wireless base station.

As a result, there is substantial fluctuation in the environment between the time of forward-link measurement timing A and the feedback information communication timing C, so that the feedback information cannot be correctly utilized, and there is an increased possibility of more prominent degradation of characteristics.

Even when the number of relay stations within the area of a wireless base station 10 is constant, if the number of hops for one mobile terminal station increases, a delay in the feedback signal for that terminal station occurs according to the total relay processing time. In this case there is no modification of the frame format, but the time required from the measurement timing at the mobile terminal station until the feedback signal reaches the wireless base station 10 increases due to the increased number of hops.

Hence an object of the invention is to provide an adaptive multi-antenna system in which, by selecting the multi-antenna communication method adaptively corresponding to such changes, throughput and communication quality are improved, and the amount of terminal processing is reduced.

Means to be Solved by the Invention

A mobile communication system using an adaptive multi-antenna of this invention comprises a wireless base station, a wireless relay station, and a mobile terminal station which communicates with the wireless base station via the wireless relay station; the wireless base station has a multi-antenna. The mobile communication system is characterized by switching a multi-antenna communication method according to estimation of the delay time of feedback signals from the mobile terminal station (for example, switching from a closed method to an open-loop method), or, switching the multi-antenna communication method according to a traffic quantity.

By this means, improvement of reception characteristics, effective band utilization, and optimization of processing amounts can be realized compared with cases in which use of the same multi-antenna communication method is continued.

BEST MODE FOR CARRYING OUT THE INVENTION

Below, embodiments of the invention are explained using the figures.

Figure 4:
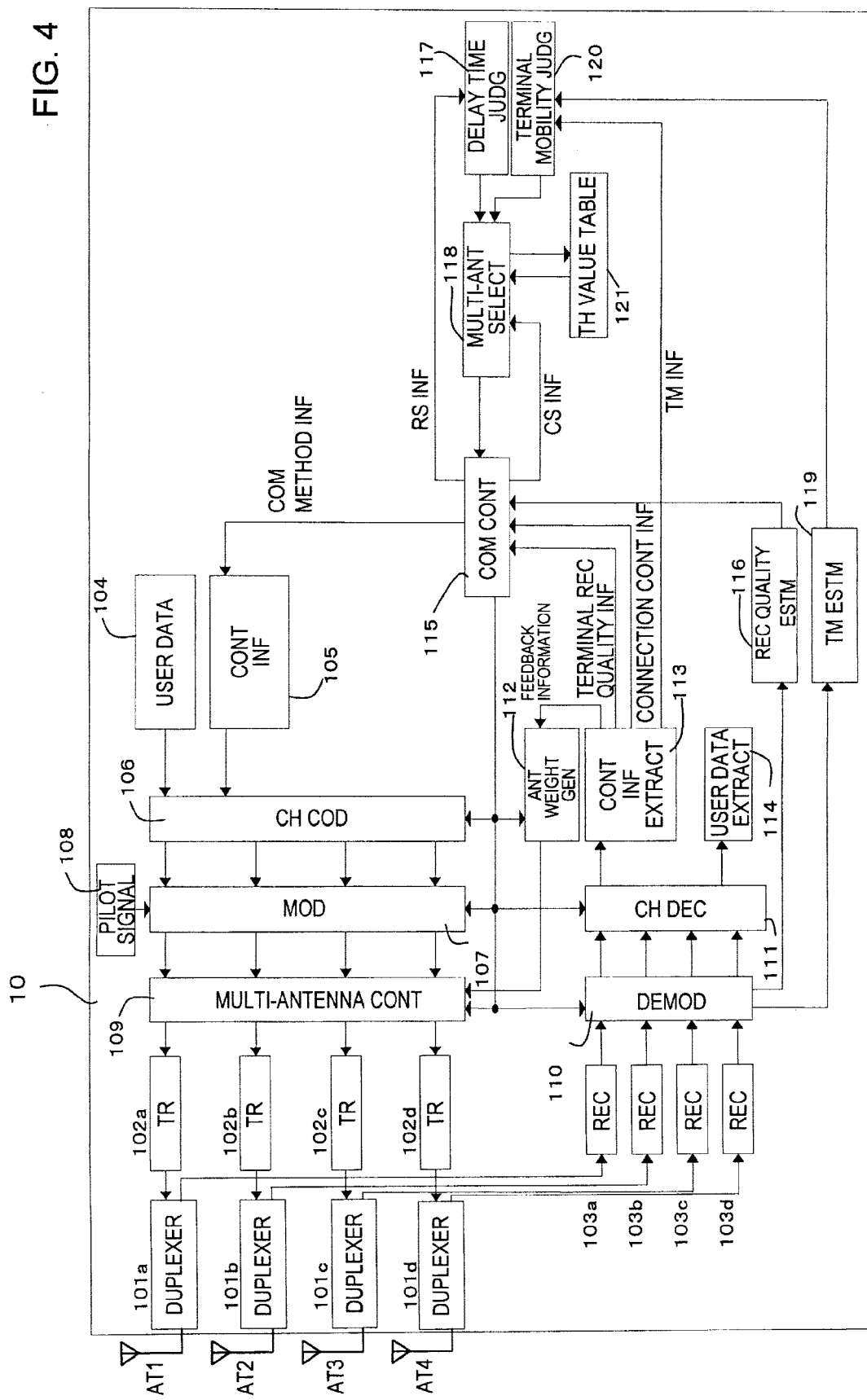
FIG. 4 illustrates a first configuration example of a wireless base station to which the invention is applied.

FIG. 4 illustrates a first configuration example of a wireless base station 10 to which the invention is applied.

Figure 6:
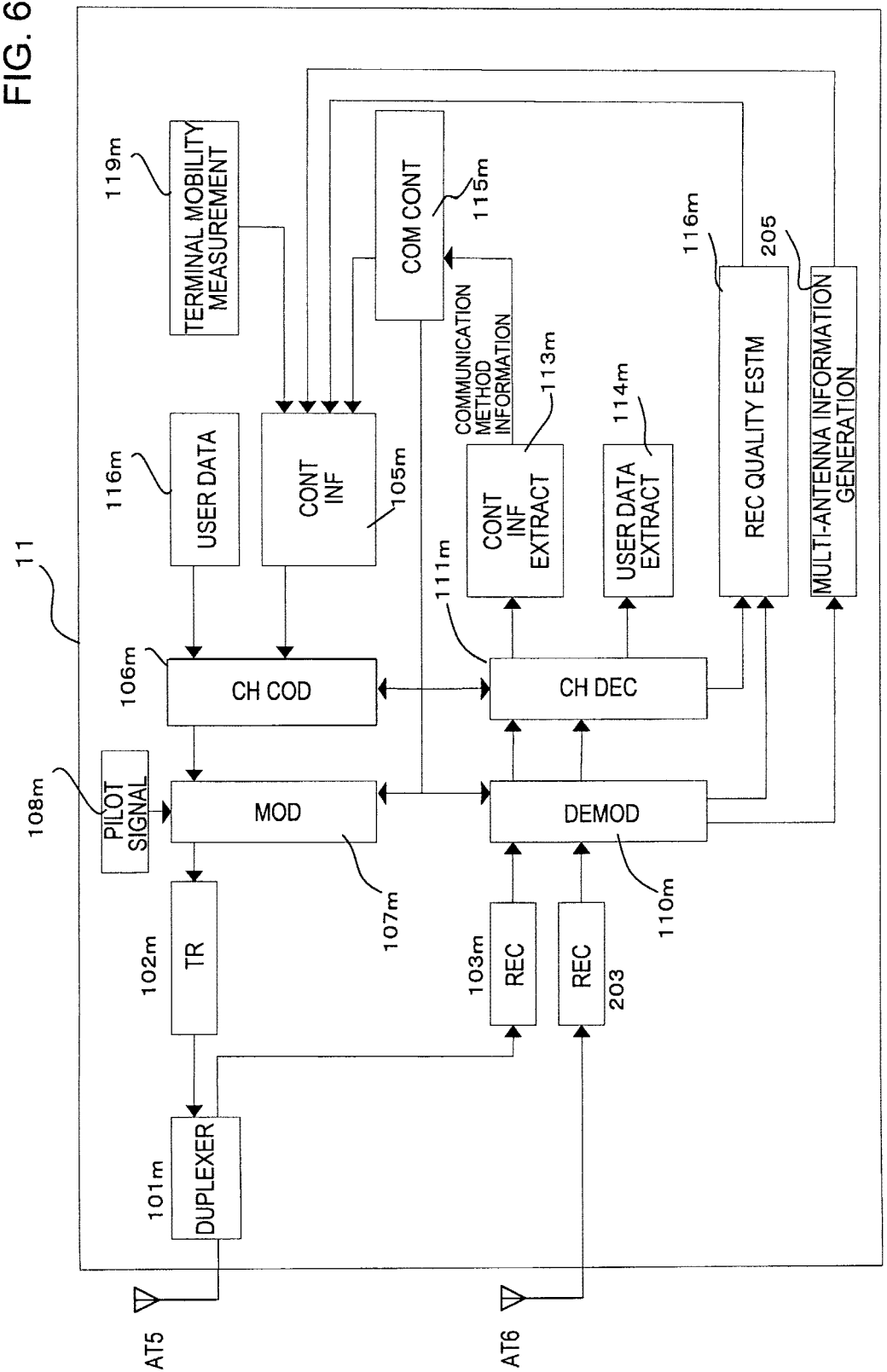
FIG. 6 illustrates a configuration example of a mobile terminal station to which the invention is applied.

FIG. 6 is a corresponding configuration example of mobile terminal stations 11a and 11b (hereafter simply referenced as 11).

In the configuration of this first embodiment, four transmission/reception antennas AT1 to AT4 are provided in the wireless base station 10, and one transmission/reception antenna AT5 and one reception-only antenna AT6 are provided in a mobile terminal station 11.

The antenna configuration is not limited to the configuration of this practical example, but can be selected appropriately according to the propagation, installation and environment conditions. As the communication method, FDMA, TDMA, CDMA, OFDMA, or another method can be employed.

Corresponding to these various methods, functional blocks for spreading and despreading in the CDMA method, for IFFT (inverse Fourier transform) and FFT (Fourier transform) in the OFDMA method, and similar, may for example be inserted as appropriate by means of the device configuration. Hence these functional portions are omitted from FIG. 4 to FIG. 6.

Further, a portion of the functions of the communication control portion 115, the multi-antenna method selection portion 118, and similar may be mounted in a wireless control station or similar other than the wireless base station.

First, the configuration of the wireless base station 10 is explained referring to FIG. 4.

In the configuration of this practical example, the multi-antenna communication method is selected from among a plurality of channel-tracking closed-loop and open-loop methods, according to the delay time resulting from changes in the number of wireless relay stations subordinate to the wireless base station and the number of hops, and the mobile terminal station mobility.

The four transmission/reception antennas AT1 to AT4 are installed at sufficiently great distances with respect to the wavelengths of carrier waves, or are installed through such methods as using horizontally and vertically polarized waves, so as to reduce spatial correlation between antennas.

These antennas AT1 to AT4 are connected to transmitters 102a to 102d and to receivers 103a to 103d by means of antenna duplexers 101a to 101d.

Data for transmission to a mobile terminal station 11 comprises data from a user data generation portion 104, used primarily by the user, and control information generated by a control information generation portion 105 used in communication control by the MAC layer and higher-level layers of the mobile terminal station 11.

In the channel coding portion 106, error correction coding, interleaving, and other processing of this data for transmission to the mobile terminal station 11 is performed.

In the modulation portion 107, QPSK, QAM or other modulation, bit repetition processing, addition of pilot signals 108 and preamble signals used in the physical layer, and other processing is performed.

In the multi-antenna control portion 109, processing corresponding to the method used, such as weighting processing for each antenna and STBC (Space Time Block Coding) encoder processing, is performed based on control information from the antenna weighting generation portion 112 and from the communication control portion 115.

Transmission digital baseband signals for each antenna from the multi-antenna control portion 109 are passed to the transmitters 102a to 102d. The transmitters 102a to 102d comprise orthogonal modulators, D/A converters, frequency converters, filters, power amplifiers, and similar, and the transmission signals are transmitted from the antennas AT1 to AT4 via the antenna duplexers 101a to 101d.

The format (number of streams and similar) of data handled by the channel coding portion 106, modulation portion 107, and multi-antenna control portion 109 differ depending on the multi-antenna communication method and the modulation and coding methods employed.

For example, when multi-stream MIMO is used, data of the corresponding number of streams is passed from the channel coding portion 106 to the modulation portion 107 and multi-antenna control portion 109, and after weighting processing, is transmitted from the antennas AT1 to AT4.

Further, when STBC (Space Time Block Coding) of one stream is performed, the data series of one stream is passed from the channel coding portion 106 to the modulation portion 107 and multi-antenna control portion 109, and in the multi-antenna control portion 109 STBC coding is performed, and the result is transmitted from the antennas AT1 to AT4.

On the other hand, in the reception-side configuration, the receivers 103a to 103d comprise low-noise amplifiers, frequency converters, filters, A/D converters, orthogonal modulators and similar, and signals received from the antennas AT1 to AT4 are converted into digital baseband signals, with interfacing in subsequent baseband processing.

In the demodulation portion 110, demodulation processing for reverse-link communications RC is performed. In the channel decoding portion 111, deinterleaving, error correction decoding, and other processing of the reverse-link communications RC are performed, and control information components are separated from user data components.

Control information components and user data components are input to the control information extraction portion 113 and to the user data extraction portion 114 respectively, and connection control information and user data are extracted.

In the antenna weighting generation portion 112, antenna weighting generation is performed based on feedback information extracted by the control information extraction portion 113 when applied to a closed loop.

The communication control portion 115 performs overall scheduling, decides the communication method to be applied to each mobile terminal station using terminal reception quality information and other information extracted from control information components, performs operation control for wireless base station transmission and reception, performs connection control of wireless relay stations 10 using connection control information extracted from reception signals, and similar.

The reception quality estimation portion 116 estimates the reception quality of reverse-link communications RC from mobile terminal stations 11.

The communication control portion 115 is notified of the estimated reception quality, and is instructed to switch the communication method and to modify power control and, if necessary, the communication path to the wireless relay station 12.

In this case, wireless relay station information (information on the number of relay stations subordinate to the wireless base station, hop number information, information on changes in frame configuration, and similar) is passed from the communication control portion 115 to the delay time estimation portion 117, and based on the estimated delay time, comparison with threshold delay times stored in advance in a threshold table 121 is performed, and if necessary modification of the multi-antenna communication method is performed in the multi-antenna method selection portion 118.

When there is modification, by connection control of a wireless relay station 12, of bands allocated to communication with the wireless relay station (for example, when there is an increase or decrease in the number of wireless relay stations within a cell), and when the number of hops increases, control to select the multi-antenna communication is similarly performed due to fluctuation in delay times.

Terminal mobility may be estimated by the terminal mobility estimation portion 119 of the wireless base station 10 from reverse-link signals from the mobile terminal station received, or the wireless base station 10 may be notified of the mobility measured by the mobile terminal station 11 through control information of the reverse-link communications RC.

The multi-antenna method selection portion 118 is notified of information estimated by the terminal mobility estimation portion 119, and of terminal mobility information determined by the terminal mobility judgment portion 120 based on terminal mobility information from the control information extraction portion 113, and is used in modifying the threshold table 121 for delay times used in method selection.

The multi-antenna method selection portion 118 is notified of the adaptive modulation method used in communication with the mobile terminal station 11, the terminal reception quality, traffic quantity, and other state information, as communication state information, and the throughput, processing amount, and band use efficiency are taken into consideration to select the multi-antenna communication method.

For multi-user communication, by taking into consideration delay times and mobilities among users, different multi-antenna communication methods can be divided in the time direction and in the frequency direction and utilized.

Figure 5:
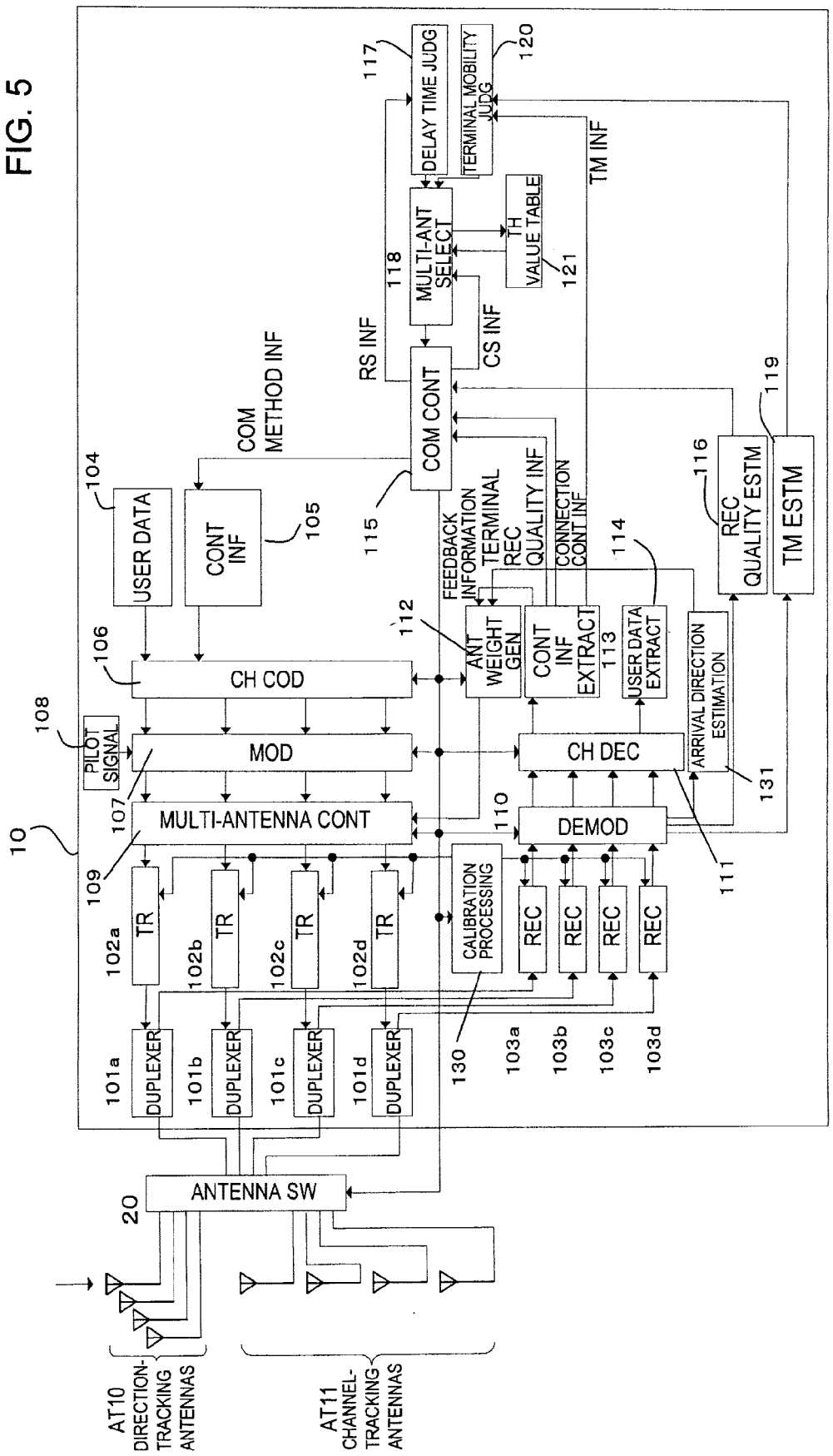
FIG. 5 illustrates a second configuration example of a wireless base station to which the invention is applied.

FIG. 5 is a block diagram of a second configuration example of a wireless base station 10 to which the invention is applied.

The configuration of this practical example is an example of a configuration to select a channel-tracking method or a direction-tracking method as the multi-antenna communication method.

Portions differing from the first configuration example of FIG. 4 are explained. In order to prevent degradation due to increases in feedback delay, a first antenna set AT10, having a configuration with a high correlation between antennas in order to use a direction-tracking method, and a second antenna set AT11, conversely configured such that channel independence for each antenna is raised and correlation is low for advantages in multi-stream transmission, for use in channel-tracking methods, are prepared.

Specifically, the first antenna set AT10 is installed with the distance between adjacent antennas close, at 0.5 times to 1 time the carrier wavelength, so that correlation is high. On the other hand, the second antenna set AT11 is installed with the installation distance made large compared with the carrier wavelength, or else a method of employing horizontally and vertically polarized waves is used, for low correlation.

As illustrated in FIG. 5, the first antenna set AT10 and the second antenna set AT11 need not be prepared as separate antennas, and a portion of the antennas may be shared by both the sets.

These antenna sets AT10 and AT11 are switched and used based on instructions from the communication control portion 115 according to the multi-antenna communication method to be used.

The place for performing switching between the antenna sets AT10 and AT11 is not limited to the antenna switch 20 in the wireless frequency (RF) portion immediately after the antennas illustrated in FIG. 5. That is, the antenna sets AT10 and AT11 can be selected within a range in which dual configuration is possible. For example, the transmitters and receivers 102a to 102d and 103a to 103d may be prepared for each antenna, with switching performed through processing by a digital baseband stage.

When using a direction-tracking method, antenna weightings may be generated based on feedback information from mobile terminal stations 11, or arrival direction estimation by an arrival direction estimation portion 131 using reverse-link communication signals received from the mobile terminal station 11 by the wireless base station 10, and antenna weightings determined from convergence algorithms based on MMSE reference and similar, may be employed.

When using a direction-tracking method, there are cases in which calibration is necessary in the calibration processing portion 130 of the RF portion. In order to reduce the wireless base station processing amount and power consumption, this calibration processing can be halted when a direction-tracking method is not being used.

By using the wireless base station configuration of this practical example, a channel-tracking method and a direction-tracking method can be adaptively switched and used according to increases and decreases in the number of wireless relay stations and changes in mobile terminal station mobility.

Next, the configuration of the mobile terminal station 11 illustrated in FIG. 6 is explained. The functions of each block are substantially the same as the functions of the wireless base station. Functional portions similar to the functions of the wireless base station 10 are indicated by appending the index (m) to the reference numbers used in FIG. 4.

In a mobile terminal station 11, the multi-antenna communication method used by the wireless base station 10 is recognized based on communication method information appended to the control information portion of the forward-link communications FC, obtained from forward-link communications FC signals received by the reception antennas AT5 and AT6 after passing through the receivers 103m and 203 and the demodulation portion 110m, and a corresponding reception method is determined in the demodulation portion 110m and the channel decoding portion 111m.

For example, when wireless base station transmission adopt a precoding MIMO method, signals received by the two reception antennas ANT5, 6 are demodulated by the demodulation portion 110m with simple diversity combination performed.

When the wireless base station 10 performs STBC transmission, the demodulation portion 110m first performs STBC decoding processing, and then performs diversity combination. In the multi-antenna information generation portion 205, information necessary for operation of a closed-loop method is generated. For example, in the antenna selection MIMO method, channel information is estimated and antenna selection information is generated by the wireless base station 10 based on pilot signals inserted for each antenna.

In a MIMO method using a codebook, terminal reception quality values when applying sets of weightings specified in the codebook are estimated, and information representing the optimum weighting set is generated.

By employing the configuration of this practical example, an open-loop method and a closed-loop method can be switched and used adaptively according to increases and decreases in the number of wireless relay stations and changes in mobile terminal station mobility.

A control procedure in a mobile communication system using an adaptive multi-antenna of this invention is explained below, referring to the above configuration examples for the wireless base station 10 and mobile terminal stations 11.

Figure 7:
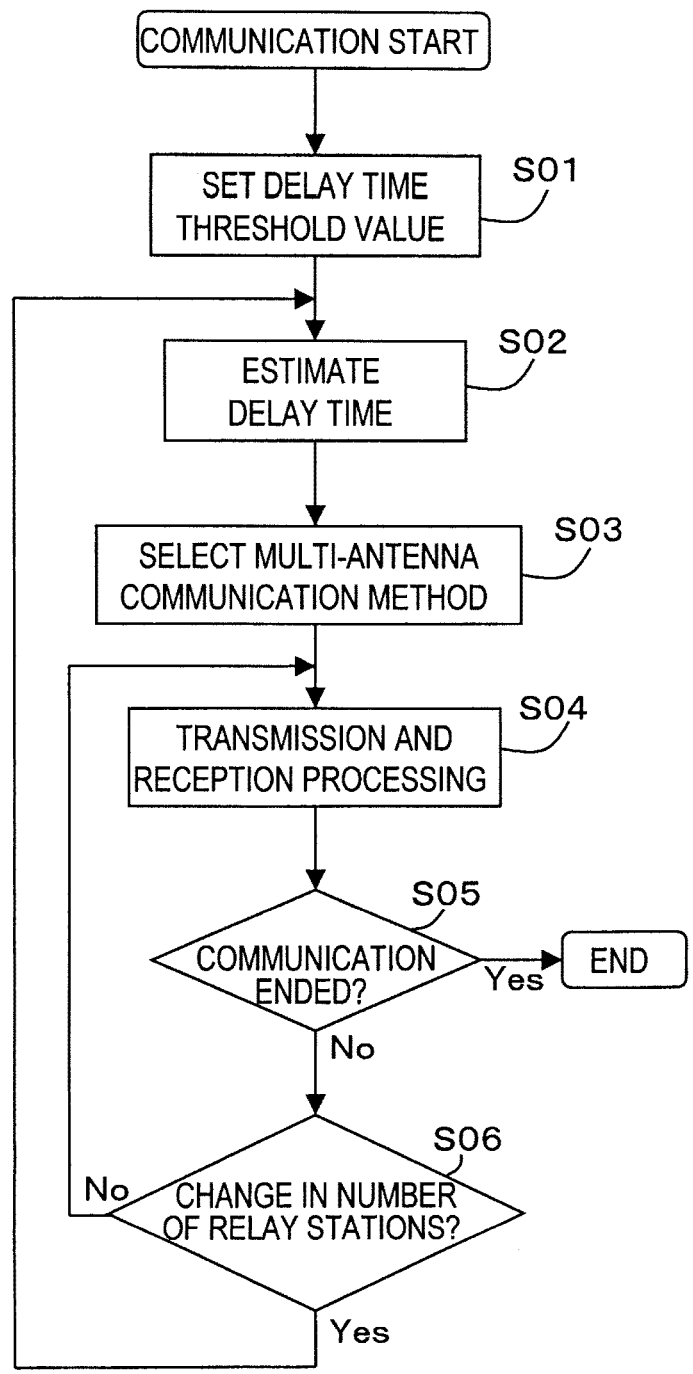
FIG. 7 is a summary flow diagram of the control procedure in multi-antenna communication according to the invention.

FIG. 7 illustrates in summary the flow of a control procedure for multi-antenna communication according to this invention.

The multi-antenna method selection portion 118 of the wireless base station 10 illustrated in FIG. 4 sets in advance, in the threshold value table 121, a feedback delay time threshold value for switching the multi-antenna communication method (step S01).

Wireless relay station information is received from the communication control portion 115, and the delay time with the wireless base station 10 of the mobile terminal station 11 of interest is estimated by the delay time estimation portion 117 (step S02). The multi-antenna method selection portion 118 compares this estimated delay time with the threshold value for the delay time set in the threshold value table 121, and selects the multi-antenna communication method (step S03).

Further, delay time estimation can also be performed using the actual measured time from transmission of a signal used in measurement until feedback information is received via the reverse link, but calculation is also possible through computations based on the wireless frame configuration which is modified according to changes in bands to be allocated to wireless relay stations.

For example, in the case of a change as in FIG. 3(B), by calculating the time between (1) and (2) (as well as the time corresponding to the difference between the transmission timing for the signal used in the measurement at (1) and the reception timing for receiving the feedback signal via the reverse link), the delay time can be estimated. And, regardless of changes in bands to be allocated among wireless relay stations, when transmission of feedback information is shared among a plurality of terminals, depending on the degree of congestion (the number of terminals to which feedback information is to be transmitted and similar), the time of delay from measurement to feedback information transmission can be estimated as the delay time.

Apart from congestion, when the feedback information transmission band is reduced or in similar circumstances, the delay time increases, and so the delay time can also be estimated from the feedback information transmission band (with a large delay when the transmission band is small, and a small delay when the transmission band is large).

In such multi-antenna communication method selection (step S03), when the feedback information delay time is smaller than the threshold value, the closed-loop method is selected, and when the delay time is larger than the threshold value, the open-loop method is used.

Here, delay time threshold values for switching set in the threshold value table 121 are values set such that the effect of application is heightened by switching the method, based on characteristics anticipated when the closed-loop method and open-loop method are each employed, judging from such factors as the propagation environment, terminal mobility, and modulation method used.

Further, in selecting a multi-antenna communication method (step S03), method selection is also possible in which a channel-tracking method in which control for each channel tracks channel variations is selected when the delay time is smaller than the threshold value, and when the delay time is larger a direction-tracking method which tracks the spatial transmission direction is used.

The delay time threshold value for switching in this case is set to a value such that the advantageous result of method switching is heightened, based on characteristics anticipated when the channel-tracking method and direction-tracking method are each employed, judging from such factors as the propagation environment, terminal mobility, and modulation method used.

In FIG. 7, when selection of the multi-antenna communication method (step S03) is completed, control is executed by the communication control portion 115 so as to perform transmission and reception using the method selected (step S04).

When, before the end of communication (No in step S05), there is a change in the bands allocated to wireless communication with wireless relay stations (a change in the number of wireless relay stations) or a change in the number of hops (Yes in step S06), processing again returns to step S02, and processing to estimate the delay time is performed.

As explained above, when the number of wireless relay stations intervening in communication between a wireless base station and a mobile terminal station changes due to motion of the mobile terminal station during communication or other factors, by monitoring the number of wireless relay stations an increase in the delay can be predicted, and so the multi-antenna communication method is selected according to such changes in the number of wireless relay stations. By this means, optimal communications can be performed, accommodating changes in feedback delay time.

Hence by means of this practical example, improvement of reception characteristics, effective band utilization, and optimization of processing amounts can be realized compared with cases in which use of the same multi-antenna communication method is continued regardless of such changes in the number of wireless relay stations (changes in the number of hops).

And, by means of this practical example, delay increases can be predicted by monitoring the number of wireless relay stations intervening in communications. Hence in cases in which closed-loop method characteristics are anticipated to be degraded compared with open-loop methods due to delay increases, by switching to an open-loop method without waiting for degradation of characteristics, communication quality can be maintained and the occurrence of wasteful feedback traffic can be prevented.

On the other hand, when it is predicted that there are few feedback delays, a closed-loop method is selected, so that improvement of characteristics and reduction of the amount of terminal processing can be realized. That is, the optimal multi-antenna communication method can be selected to accommodate changes in feedback delay.

Here, when there is a change in the mobility of a mobile terminal station 11, there are cases in which the threshold value set in the threshold value table 121 requires resetting.

Figure 8:
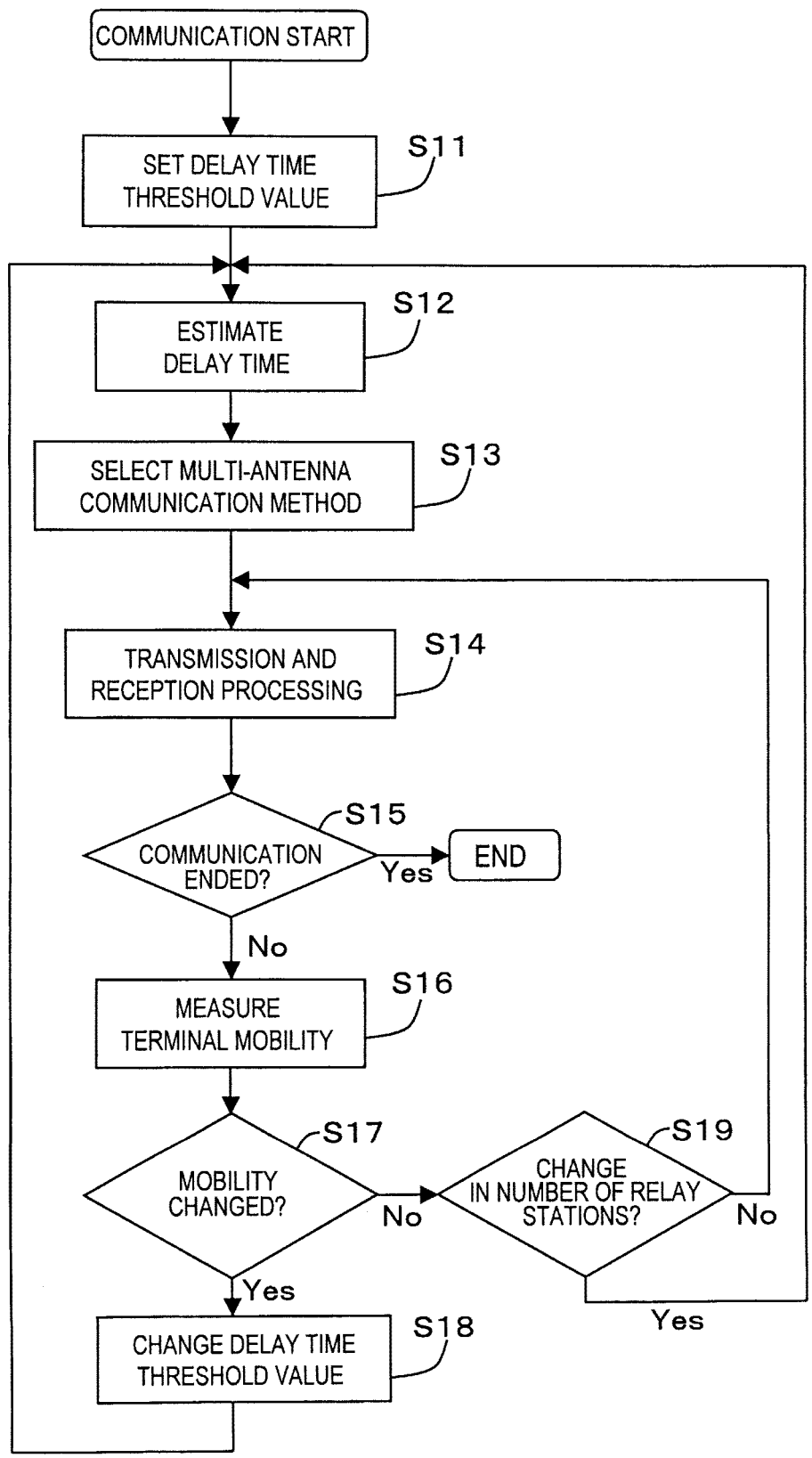
FIG. 8 is a summary flow diagram of the control procedure in multi-antenna communication of the invention, in which processing is performed corresponding to changes in mobility of a mobile terminal station.

FIG. 8 is a flowchart explaining this processing; relative to the flow explained in FIG. 7, steps S11 to S15 and S19 correspond to steps S01 to S05 and S06, and in steps S16 to S18 processing is performed corresponding to changes in the mobility of the mobile terminal station.

That is, in FIG. 8 terminal mobility measurement is performed (step S16), and a judgment is made as to whether the mobility of the mobile terminal station 11 has changed (step S17). If there has been no change in the mobility of the mobile terminal station 11 (No in step S17), a change in the number of wireless relay stations is detected (step S19). If there has been a change in the number of wireless relay stations (Yes in step S19), processing transitions to delay time estimation (step S12). If there has been no change in the number of wireless relay stations, processing returns to step S14, and transmission and reception are continued (No in step S19).

When there is a change in mobility (Yes in step s17), the delay time threshold value of the threshold value table 121 is changed (step S18), and processing transitions to delay time estimation (step S12).

And, because variations in the direction of received signals are overwhelmingly slower than variations in phase or amplitude, robustness with respect to characteristic degradation due to feedback delay is greater for direction-tracking methods. By means of this practical example, increases in delays can be predicted by monitoring changes in the number of wireless relay stations intervening in communications.

Consequently, in cases in closed-loop control can no longer track channel variations due to an increase in the delay, and a direction-tracking method is anticipated to be more effective, switching to the direction-tracking method is performed without for degradation of characteristics. As a result, directionality of the communication path direction toward the mobile terminal station is formed regardless of channel variations, degradation of communication quality can be reduced, and the amount of unnecessary traffic processing can be decreased.

As explained above, when the mobile terminal station mobility increases, the channel coherent time grows shorter, and when a closed-loop method is used, characteristics are rapidly degraded as the delay time increases.

Conversely, when mobility is low, robustness with respect to delay time is high. Hence the effect of application of multi-antenna communication methods with respect to delay time varies with mobility. By means of this invention, by controlling the threshold value for switching between methods based on the mobility, when the extent to which characteristics are affected by the feedback delay time changes depending on the terminal mobility, the optimal multi-antenna communication method can be selected.

On the other hand, when the feedback delay is predicted to decrease, by using a channel-tracking method which utilizes the independence of channels for each antenna, throughput can be improved compared with direction-tracking methods.

Figure 9:
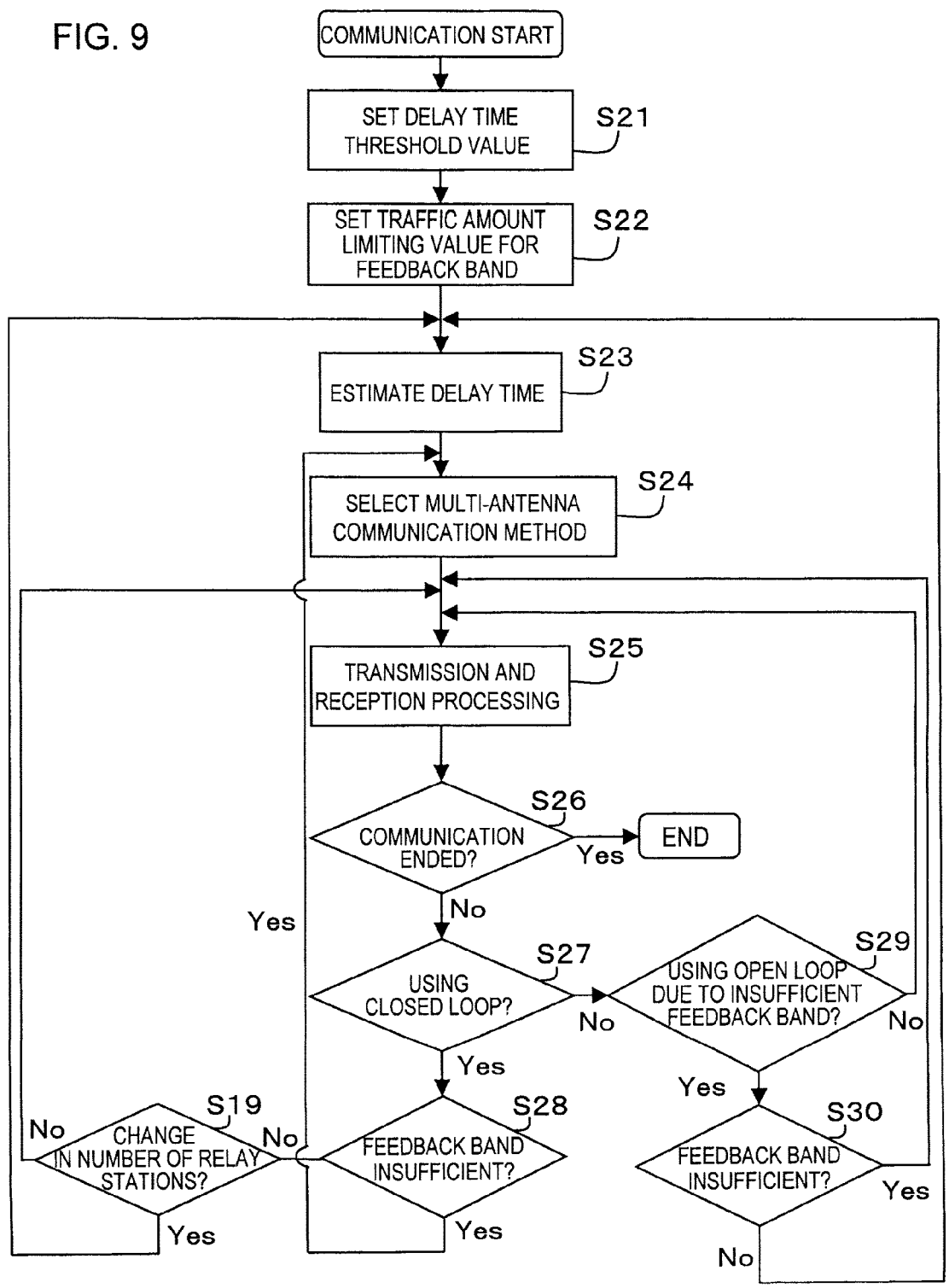
FIG. 9 illustrates the flow of processing to control switching of closed-loop and open-loop multi-antenna communication corresponding to the usage ratio of a band for feedback.

FIG. 9 illustrates the flow of processing to control switching to an open-loop method according to the band usage ratio, when performing multi-antenna communication using a closed-loop method.

In the example illustrated in FIG. 9, when closed-loop method multi-antenna communication is being performed, the usage ratio of the band used in transmission of feedback information is monitored, and there is a possibility of an increase in the feedback delay time due to overloading, or when there is a possibility of delays in other traffic due to feedback information transmission, control is performed to switch to an open-loop method not requiring transmission of feedback information.

Further, when an open-loop method is adopted due to insufficiency of the band used in transmission of feedback information, and when latitude occurs in the traffic quantity, a judgment is made to switch to a closed-loop method.

That is, in FIG. 9, a feedback delay time threshold value is set in advance in the threshold value table 121 for the multi-antenna method selection portion 118 of the wireless base station 10 illustrated in FIG. 4 to switch the multi-media communication method (step S21).

Next, a traffic quantity limit threshold value for the feedback band is set in the threshold value table 121 (step S22).

Wireless relay station information is received from the communication control portion 115, and the delay time estimation portion 117 estimates the delay time between the mobile terminal station 11 of interest and the wireless base station 10 (step S23).

The multi-antenna method selection portion 118 compares the estimated delay time with the delay time threshold value set in the threshold value table 121, and selects the multi-antenna communication method (step S24).

That is, in selecting the multi-antenna communication method (step S24), when the feedback information delay time is smaller than the threshold value, the closed-loop method is selected, and when the delay time is larger than the threshold value, the open-loop method is used.

Assume now that the closed-loop method is selected. Transmission and reception processing using the closed-loop method is performed (step S25). If communication processing has not ended (No in step S26), because the closed-loop method is being used (Yes in step S27), a comparison is made with the limiting threshold value for the traffic quantity of the feedback band previously set in the threshold value table 121, and a judgment is made as to whether the band for feedback is insufficient (step S28).

When it is judged that the feedback band is insufficient (Yes in step S28), processing returns to step S24, and the multi-antenna communication method is switched from the closed-loop method to use the open-loop method.

As a result, when it is judged in step S27 that the closed-loop method is not being used (No in step S27), and moreover the reason the closed-loop method is not being used is that the feedback band is not insufficient (No in step S29), and when the reason why the closed-loop method is not currently being used is that the feedback band is insufficient (Yes in step S29) and moreover the feedback band is still insufficient (Yes in step S30), processing returns to step S25 without selecting a multi-antenna communication method, and transmission and reception processing is continued.

On the other hand, when the reason why the closed-loop method is not currently being used is that the feedback band is insufficient (Yes in step S29), and moreover the current feedback band insufficiency is resolved (No in step S30), processing returns to step S23, the delay time is modified, and delay time estimation is performed.

Further, when in step S28 it is judged that the feedback band is not insufficient (No in step S28), a change in the number of wireless relay stations is detected (step S19), if there is a change in the number of wireless relay stations (Yes in step S19), processing transitions to estimation of the delay time (step S23). If there is no change in the number of wireless relay stations, processing returns to step S25, and transmission and reception are continued (No in step S19).

In the above, judgments of the feedback loop band are made by the communication control portion 115.

Figure 1:
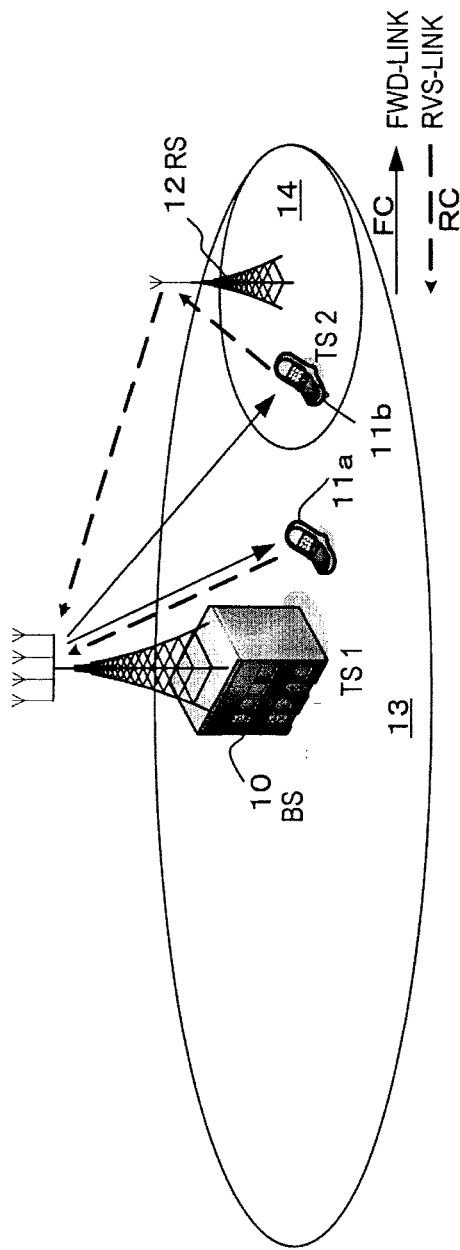
FIG. 1 is a first conceptual diagram of a mobile communication system to which the invention is applied.
Figure 2:
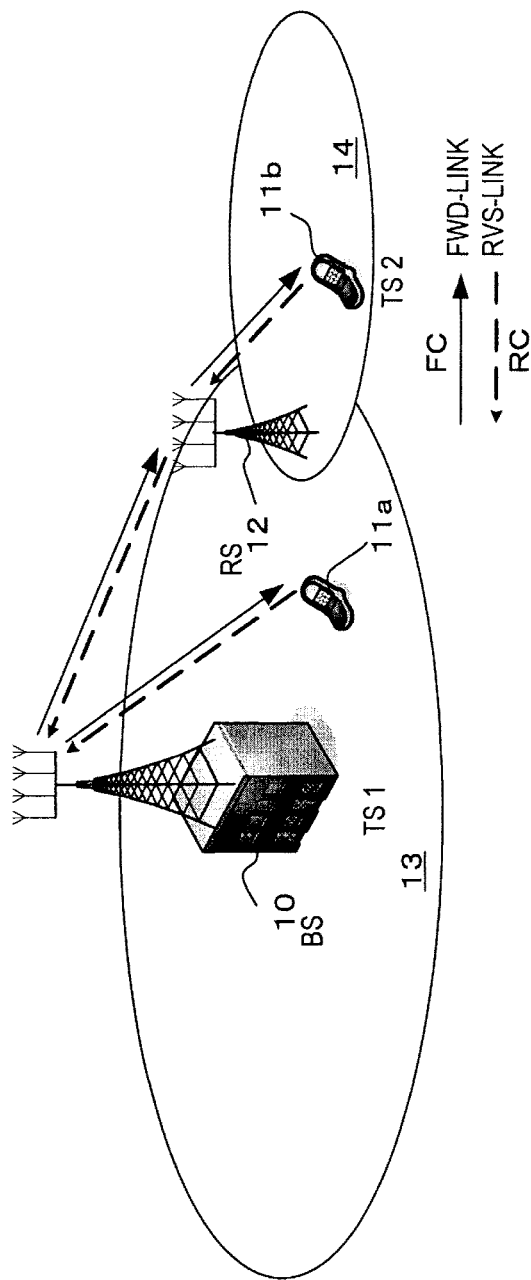
FIG. 2 is a second conceptual diagram of a mobile communication system to which the invention is applied.
Figure 3:
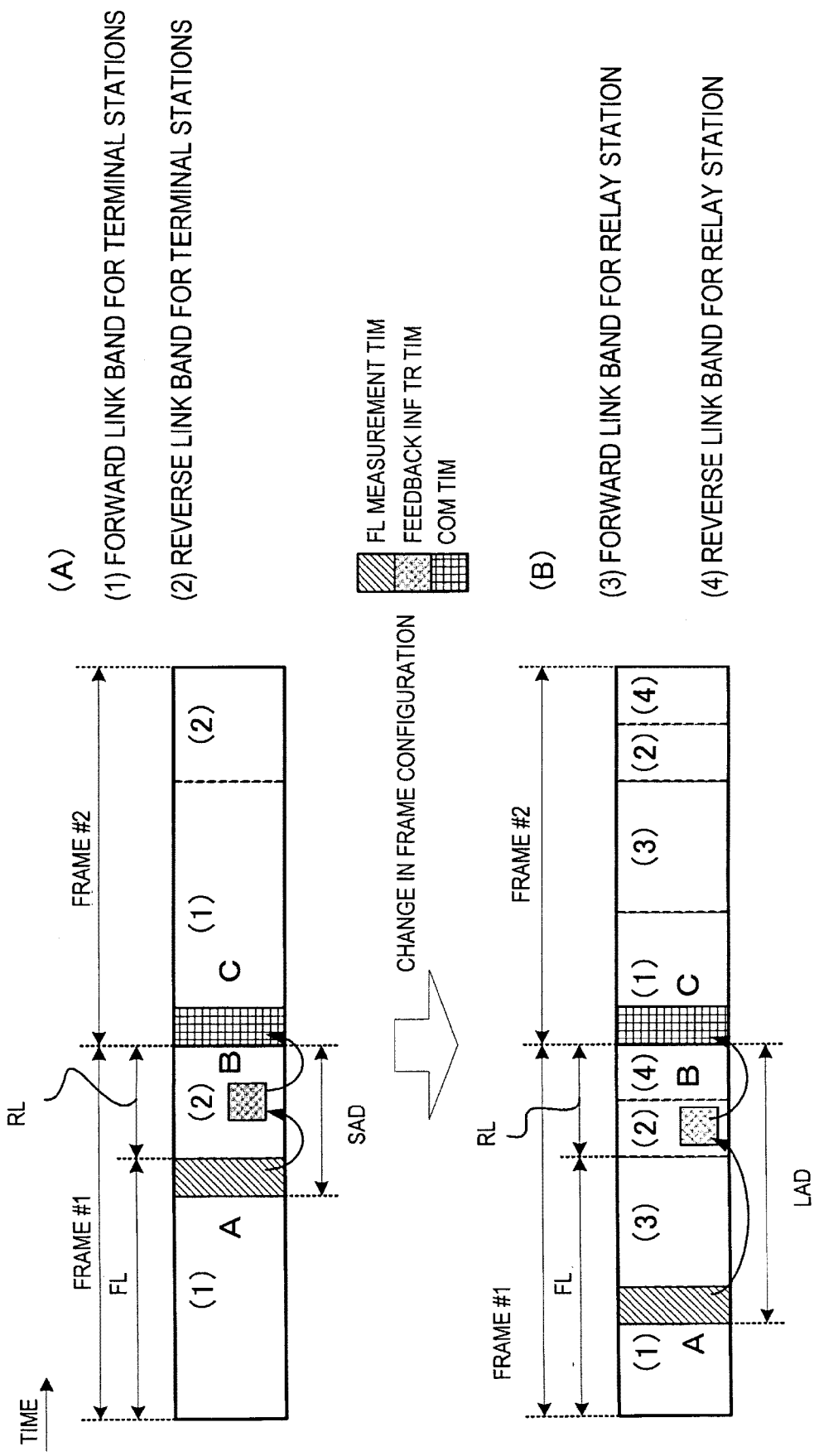
FIG. 3 explains a wireless frame configuration when used corresponding to FIG. 1 and FIG. 2.
Figure 10:
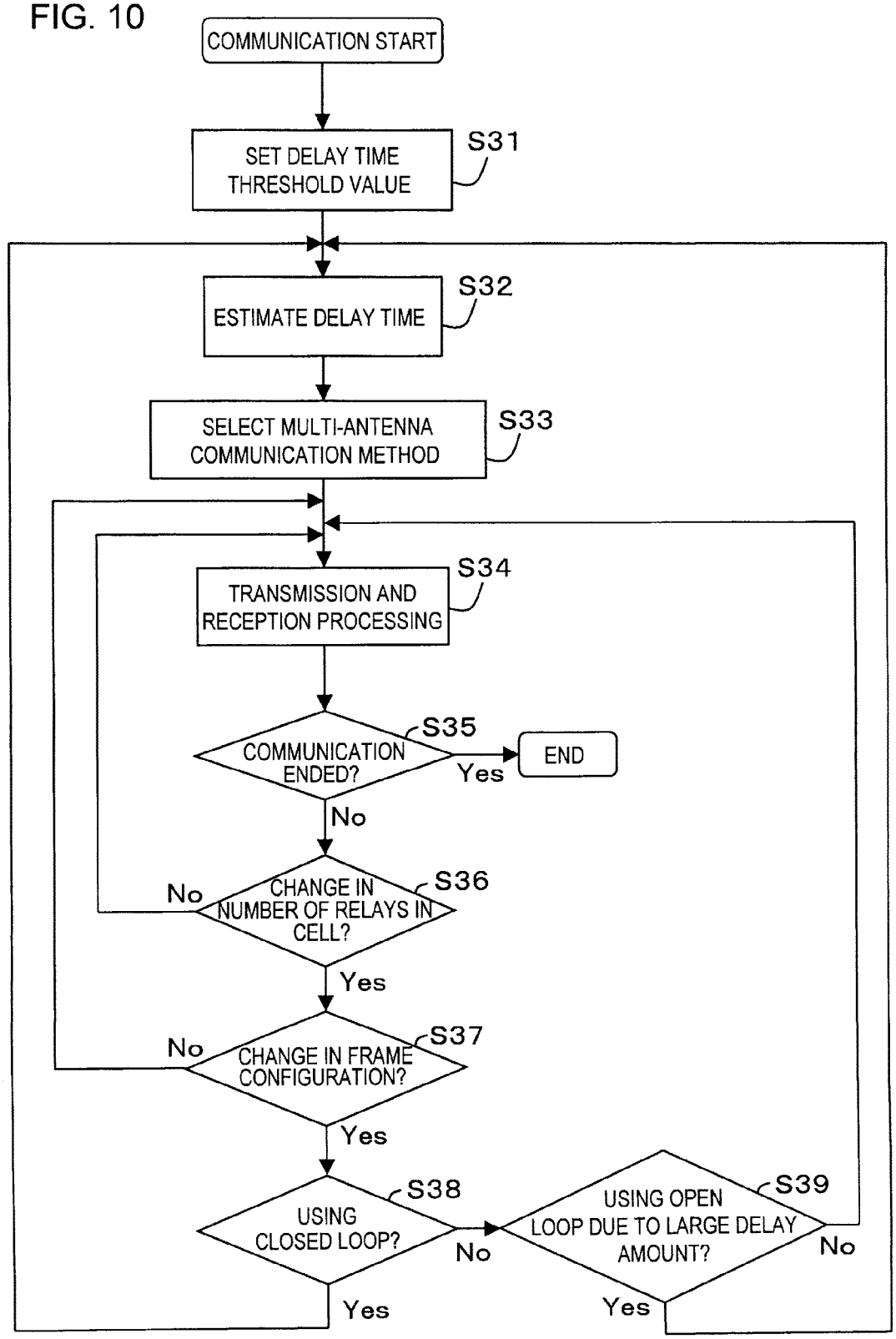
FIG. 10 illustrates the flow of processing to control switching of closed-loop and open-loop multi-antenna communication according to delay times due to fluctuation in the number of wireless relay terminals.

Next, as explained in FIG. 3, the processing illustrated in FIG. 10 is a processing flow to control switching between a closed-loop method and an open-loop method of multi-antenna communication, according to the delay time due to fluctuations in the number of wireless relay stations within the cell covered by the wireless base station 10.

When a mobile wireless relay station 12 nearly enters into a cell covered by the wireless base station 10, and the wireless frame configuration changes in order to secure a communication band, and when the delay time between the timing of measurement by terminals for method selection and the timing of performing multi-antenna communication reflecting the feedback information increases, multi-antenna communication method switching is performed.

Further, when a change occurs in the frame configuration due to withdrawal of a mobile wireless relay station 12 from the cell, and when an open-loop method is being used due to an excessive delay time, multi-antenna communication method selection is performed.

To provide further explanation according to the flow of processing, in FIG. 10 the processing from step S31 to step S35 is the same as the processing in the basic flow illustrated in FIG. 7. In the example illustrated in FIG. 10, not only the number of wireless relay stations connected to mobile terminal stations during multi-antenna communication, but also the number of all wireless relay stations connected to the wireless base station 10 are monitored. When there is a change in the number of wireless relay stations in the cell (Yes in step S36), a judgment is made as to whether there is a change in the frame configuration (step S37). If there is no change in the frame configuration, transmission and reception processing is continued (No in step S37). If there is a change in the frame configuration (Yes in step S37), and moreover the closed-loop method is being used (Yes in step S38), processing returns to the delay time estimation processing of step S32.

If the closed-loop method is not being used (No in step S37), a judgment is made as to whether the open-loop method is being used due to an increased delay amount (step S39). If use is due to an increased delay amount (Yes in step S39), it is possible that the situation is improved through modification of the frame configuration, and so processing returns to step S32, and processing to estimate the delay time is again performed.

Further, if use of the open-loop method is not due to an increased delay amount (No in step S39), transmission and reception processing is continued (step S34).

Figure 11:
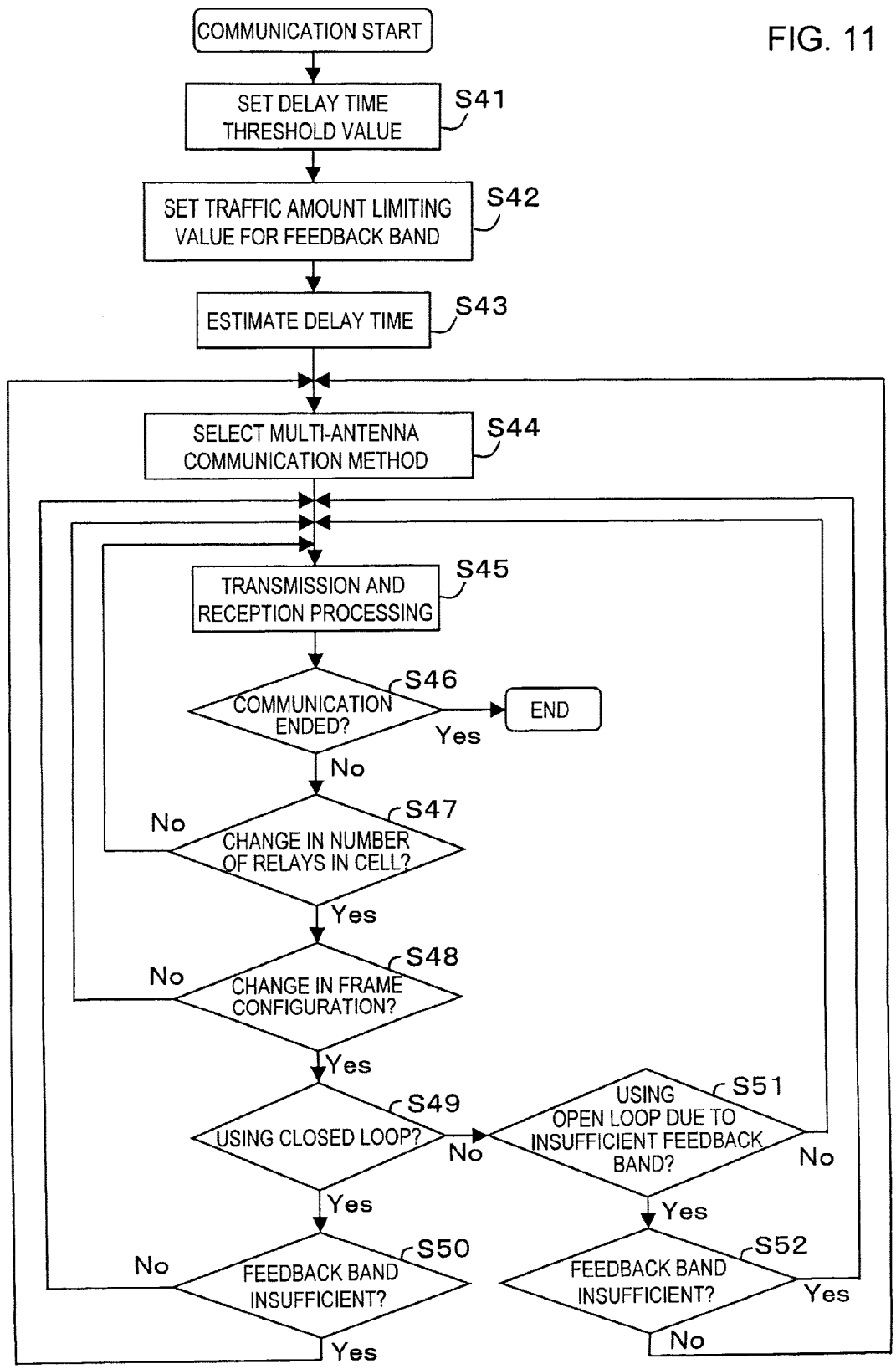
FIG. 11 illustrates the flow of processing to control switching of closed-loop and open-loop multi-antenna communication according to fluctuations in the band for feedback due to fluctuations in the number of wireless relay stations.

FIG. 11 illustrates the flow of still other processing, and is processing for a case in which control is performed to switch multi-antenna communication between the closed-loop method and the open-loop method, according to changes in the feedback band due to changes in the number of wireless relay stations within the cell covered by the wireless base station 10.

When the band which can be used for feedback information decreases, and the occurrence of delays is anticipated, multi-antenna communication method selection is performed. Also, when a change in the frame configuration occurs due to withdrawal of a wireless relay station, and when the open-loop method is being used due to feedback band insufficiency, reselection of the multi-antenna communication method is performed.

That is, in FIG. 11 a feedback delay time threshold value to switch the multi-antenna communication method is set in advance in the threshold value table 121 by the multi-antenna method selection portion 118 of the wireless base station 10, illustrated in FIG. 4 (step S41).

Then, a limiting quantity for the traffic quantity of the feedback band is set in the threshold value table 121 (step S42).

Wireless relay station information is received from the communication control portion 115, and the delay time judgment portion 117 estimates the delay time with the wireless base station 10 of the mobile terminal station 11 of interest (step S43).

The multi-antenna method selection portion 118 compares the estimated delay time with the delay time threshold value set in the threshold value table 121, and selects the multi-antenna communication method (step S44).

That is, in selecting the multi-antenna communication method (step S44), when the feedback information delay time is smaller than the threshold value the closed-loop method is selected, and when the delay time is larger than the threshold value the open-loop method is used.

Assume now that the closed-loop method is selected. Transmission and reception processing using the closed-loop method is performed (step S45).

If communication processing has not ended (No in step S46), a judgment is made as to whether there has been a change in the number of wireless relay stations within the cell, and if there has been no change in the number of wireless relay stations within the cell, transmission and reception processing is continued (No in step S47).

If there has been a change in the number of wireless relay stations in the cell (Yes in step S47), a further judgment is made as to whether there has been a change in the frame configuration (step S48). If there has been no change in the frame configuration, transmission and reception processing is continued (No in step S48).

If there has been a change in the frame configuration (Yes in step S48), a further judgment is made as to whether the closed-loop method is being used (step S49).

If the closed-loop method is being used (Yes in step S49), and if the feedback band is not insufficient, then transmission and reception processing is continued (No in step S50). If the feedback band is insufficient (Yes in step S50), processing returns to multi-antenna communication method selection (step S44).

Further, if in step S49 the closed-loop method is not being used (No in step S49), a judgment is made as to whether an open loop is being used due to feedback band insufficiency (step S51), and if an open loop is not being used due to feedback band insufficiency (No in step S51), transmission and reception processing is continued without change (step S45).

When use of an open loop is due to feedback band insufficiency (Yes in step S51), and the feedback band is not recovered (Yes in step S52), transmission and reception processing is continued without change (step S45), and if the feedback band is recovered, processing transitions to multi-antenna communication method selection processing (step S44).

INDUSTRIAL APPLICABILITY

As described in the above explanation of the invention referring to the drawings, a wireless base station having a multi-antenna is characterized in switching the multi-antenna communication method according to changes in the delay time of feedback signals.

Because it is possible to switch the multi-antenna communication method adaptively corresponding to changes in the environment, an adaptive multi-antenna system can be provided in which throughput and communication quality are improved, and the amount of terminal processing can be reduced. Hence the invention will make important contributions to industry.

What is claimed is:

1. A mobile communication system using an adaptive multi-antenna, comprising:
    a wireless base station;
    a wireless relay station; and
    a mobile terminal station which performs communication with the wireless base station via the wireless relay station,
    wherein the wireless base station has a multi-antenna, and
    a multi-antenna communication method is switched to a closed loop method which uses feedback signals from the mobile terminal station, and an open-loop method which does not use the feedback signal according to estimation of the delay time of feedback signals from the mobile terminal station, and
    wherein the multi-antenna communication method to be switched further comprises a channel-tracking method which controls each antenna of the multi-antenna to track variations in a wireless propagation channel, and a direction-tracking method which forms directionality in an optimum transmission direction.

2. The mobile communication system using an adaptive multi-antenna according to claim 1, wherein a threshold value of the delay time of feedback signals for switching the multi-antenna communication method is changed by the mobility of the mobile terminal station.

3. A mobile communication system using an adaptive multi-antenna, comprising:
    a wireless base station;
    a wireless relay station; and
    a mobile terminal station which performs communication with the wireless base station via the wireless relay station,
    wherein the wireless base station has a multi-antenna,
    a multi-antenna communication method is switched according to estimation of the delay time of feedback signals from the mobile terminal station, and
    wherein the delay time of feedback signals from the mobile terminal station corresponds to a delay time between a timing of measurement at the mobile terminal station used for the multi-antenna communication method, and a timing of multi-antenna transmission based on information on the results of the measurement which is fed back to the wireless base station.

4. The mobile communication system using an adaptive multi-antenna according to claim 1, wherein the switching of the multi-antenna communication method between the closed-loop method and the open-loop method is further performed according to a traffic quantity in a feedback signal band used in the closed-loop method.

5. The mobile communication system using an adaptive multi-antenna according to claim 1, wherein switching of the multi-antenna communication method between the closed-loop method and the open-loop method is further performed according to changes in a feedback signal band used in the closed-loop method.

6. A wireless base station which performs communication with a mobile terminal station via a wireless relay station in a mobile communication system, and which has a multi-antenna, the wireless base station comprising:
    a judgment unit, when transmission is performed through the wireless relay station in the communication with the mobile terminal station, to judge whether there is a change in the number of the wireless relay stations;
    a delay time judgment unit to judge the delay time of feedback signals from the mobile terminal station; and
    a multi-antenna method selection unit, when the judgment unit judges that there is a change in the number of the wireless relay stations according to the delay time of feedback signals from the mobile terminal station, to switch a multi-antenna communication method that uses the multi-antenna, to a closed loop method which uses feedback signals from the mobile terminal station, and an open-loop method which does not use the feedback signal,
    wherein the multi-antenna method selection unit further selects, as the multi-antenna communication method to be switched, a channel-tracking method which controls each antenna of the multi-antenna to track variations fluctuations in a wireless propagation channel path, and a direction-tracking method which forms directionality in an optimum transmission direction.

7. A wireless base station which performs communication with a mobile terminal station via a wireless relay station in a mobile communication system, and which has a multi-antenna, the wireless base station comprising:
    a judgment unit, when transmission is performed through the wireless relay station in the communication with the mobile terminal station, to judge whether there is a change in the number of the wireless relay stations;
    a delay time judgment unit to judge the delay time of feedback signals from the mobile terminal station; and
    a multi-antenna method selection unit, when the judgment unit judges that there is a change in the number of the wireless relay stations according to the delay time of feedback signals from the mobile terminal station, to switch a multi-antenna communication method that uses the multi-antenna;
    a threshold value table in which is set a feedback signal delay time threshold value for switching the multi-antenna communication method; and
    a terminal mobility judgment unit to judge the mobility of the mobile terminal station,
    wherein the delay time threshold value set in the threshold value table is updated when the mobility of the mobile terminal station, judged by the terminal mobility judgment unit, changes.

8. The wireless base station in a mobile communication system according to claim 6, wherein the multi-antenna method selection unit further switches between the closed-loop method and the open-loop method according to a traffic quantity in a feedback signal band used in the closed-loop method.

9. The wireless base station in a mobile communication system according to claim 6, wherein the multi-antenna method selection unit further switches the multi-antenna communication method between a closed-loop method and an open-loop method according to changes in a feedback signal band used in the closed-loop method.

10. A wireless base station which performs communication with a mobile terminal station via a wireless relay station in a mobile communication system, and which has a multi-antenna, the wireless base station comprising:
    a judgment unit, when transmission is performed through the wireless relay station in the communication with the mobile terminal station, to judge whether there is a change in the number of the wireless relay stations;
    a delay time judgment unit to judge the delay time of feedback signals from the mobile terminal station;
    a multi-antenna method selection unit, when the judgment unit judges that there is a change in the number of the wireless relay stations according to the delay time of feedback signals from the mobile terminal station, to switch a multi-antenna communication method that uses the multi-antenna;

a first antenna for direction tracking, configured by a set of a plurality of antennas placed at a placement interval which heightens the correlation between antennas;

a second antenna for channel tracking, configured by a set of a plurality of antennas placed at a placement interval which lowers the correlation between antennas;

an antenna switcher to perform switching between the first antenna and second antenna; and a communication control unit to control the antenna switcher so as to perform switching between the first antenna and second antenna corresponding to selection of channel tracking or direction tracking by the multi-antenna method selection unit, wherein the multi-antenna method selection unit selects, as the multi-antenna communication method to be switched, a channel-tracking method which controls each antenna of the multi-antenna to track variations fluctuations in a wireless propagation channel path, and a direction-tracking method which forms directionality in an optimum transmission direction.

* * * * *